US006791295B1

(12) United States Patent
Berels

(10) Patent No.: US 6,791,295 B1
(45) Date of Patent: Sep. 14, 2004

(54) METHOD AND APPARATUS FOR CHARGING A HIGH VOLTAGE BATTERY OF AN AUTOMOTIVE VEHICLE HAVING A HIGH VOLTAGE BATTERY AND A LOW VOLTAGE BATTERY

(75) Inventor: David Jeffeory Berels, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 10/248,806

(22) Filed: Feb. 20, 2003

(51) Int. Cl.$^7$ .................. H01M 10/44; H01M 10/46
(52) U.S. Cl. ..................... 320/103; 320/104
(58) Field of Search ................. 320/104, 149, 320/103, 132, 134, 150

(56) References Cited

U.S. PATENT DOCUMENTS 6,323,608 B1    11/2001   Ozawa
6,396,240 B1    5/2002    Kahlon et al.
6,426,608 B2    7/2002    Amano et al.
6,580,180 B2 *  6/2003    Tamai et al. ............... 307/10.1

* cited by examiner

Primary Examiner—Edward H. Tso
(74) Attorney, Agent, or Firm—Artz & Artz; Carlos L. Hanze

(57) ABSTRACT

An electrical system for an automotive vehicle includes a low voltage battery having a low voltage, a high voltage battery having a high voltage, and a DC-to-DC converter coupled to the low voltage battery and the high voltage battery. A controller controls a conversion of the low voltage to a high voltage through the DC-to-DC converter and controls the charging of the high voltage battery with the high voltage. The controller monitors a state of charge of the high voltage battery, compares the state of charge to a predetermined state of charge and generates an indicator when the state of charge reaches the predetermined state of charge.

20 Claims, 2 Drawing Sheets

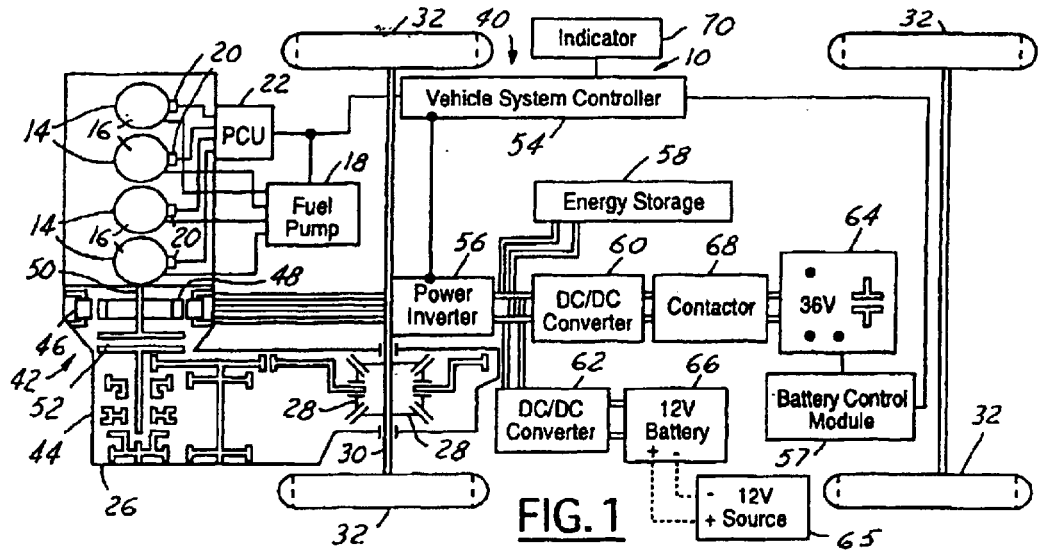
FIG. 1
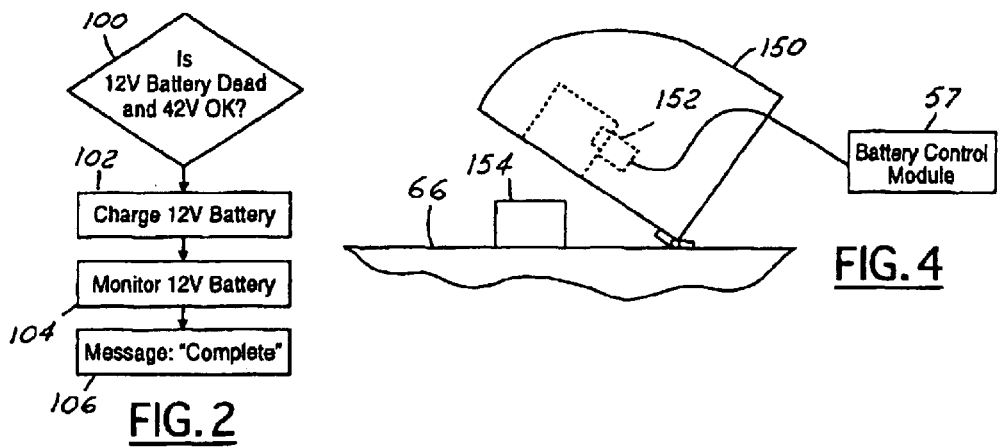
FIG. 2
FIG. 4

METHOD AND APPARATUS FOR CHARGING A HIGH VOLTAGE BATTERY OF AN AUTOMOTIVE VEHICLE HAVING A HIGH VOLTAGE BATTERY AND A LOW VOLTAGE BATTERY

BACKGROUND OF THE INVENTION

The present invention relates generally to dual voltage automotive vehicles, and more specifically, to charging the batteries of the electrical systems of the vehicle.

Automotive vehicles with internal combustion engines are typically provided with both a starter motor and alternator. In recent years, a combined alternator and starter motor has been proposed. Such systems have a rotor mounted directly to the crankshaft of the engine and a stator sandwiched between the engine block and the bell housing of the transmission. During initial startup of the vehicle, the starter/generator functions as a starter. While functioning as a starter, the starter/generator rotates the crankshaft of the engine while the cylinders are fired.

After the engine is started, the starter/generator is used as a generator to charge the electrical system of the vehicle.

Such systems may include both a 12-volt nominal system and a 36-volt nominal system, which correspond to 14 and 42-volt operating voltages, respectively. It should be noted the dual voltage systems may also be incorporated in vehicles without starter/generators.

Electrical energy from the 42-volt battery of the vehicle is used to turn the starter/generator, which in turn is used to start the motor. Energy from the 12-volt system may be used to operate the vehicle lights and instrument panel. Consequently, it is important to maintain the battery so that a certain state of charge is provided to allow the battery to provide enough power to the starter/generator to start the engine. If one or both of the batteries is low, however, the vehicle may need to be jumpstarted. Typical jumpstarting is desirable, wherein jumper cables are connected between a good battery or power source and the discharged battery. Typically, if the 42-volt battery is low it may not be charged by charging the 12-volt battery. It may not be desirable to allow the operator to charge both batteries independently to prevent mixing the voltage potentials and possibly damaging the batteries or the electrical systems.

It would therefore be desirable to provide a method and apparatus for charging a battery to provide an indication to the vehicle operator to guide the operator through the charging process.

SUMMARY OF THE INVENTION

The present invention provides a way in which to charge the vehicle batteries so that both batteries of both voltage levels become charged.

In one aspect of the invention, a method of charging a high voltage battery includes electrically coupling a first low voltage source to a low voltage battery, converting the low voltage to a high voltage, charging a high voltage battery with the high voltage, monitoring a state of charge of the high voltage battery, comparing the state of charge to a predetermined state of charge, and generating an indicator when the state of charge reaches the predetermined state of charge.

In a further aspect of the invention, a system for an automotive vehicle includes a low voltage battery having a low voltage, a high voltage battery having a high voltage, and a DC-to-DC converter coupled to the low voltage battery and the high voltage battery. A controller controls a conversion of the low voltage to a high voltage through the DC-to-DC converter and controls the charging of the high voltage battery with the high voltage. The controller monitors a state of charge of the high voltage battery, compares the state of charge to a predetermined state of charge, and generates an indicator when the state of charge reaches the predetermined state of charge.

One advantage is that the indicator may provide to the vehicle operator both instructions and the state of charge of both vehicle batteries.

Other advantages and features of the present invention will become apparent when viewed in light of the detailed description of the preferred embodiment when taken in conjunction with the attached drawings and appended claims.

BRIEF DESCRIPTION OF DRAWINGS

FIG. 1 is a schematic view of an automotive vehicle having a starter/generator system according to the present invention.

FIG. 2 is a flowchart illustrating the operation of the present invention for charging the 12-volt battery.

FIG. 4 is a side view of a battery terminal cover switching apparatus according to one embodiment of the present invention.

DETAILED DESCRIPTION

Figure 3:
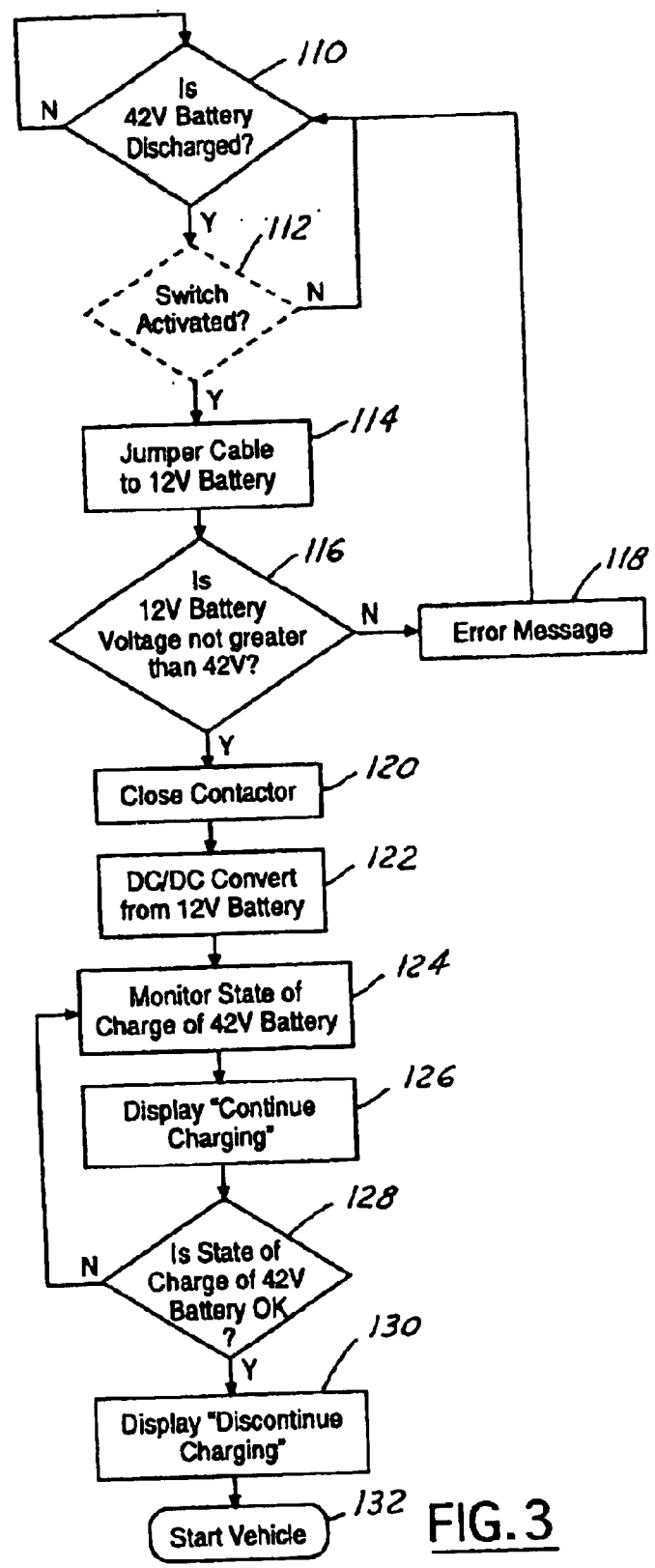
FIG. 3 is a flowchart illustrating the operation of the present invention for charging the 42-volt battery.

The present invention is described with respect to a particular configuration of a starter/generator relative to a hybrid electric vehicle. However, the teachings of the present invention may be applied to various type of vehicles having dual battery powered electrical systems.

Referring now to FIG. 1, an automotive vehicle 10 is illustrated having an internal combustion engine 12 having cylinders 14 with pistons 16 located therein. Each cylinder 14 is coupled to a fuel pump 18 through a fuel injector (not shown) or other fuel delivery system. Each cylinder 14 also has a spark plug 20 or other ignition source coupled to a powertrain control unit. A powertrain control unit 22 controls the ignition timing and fuel pump 18 operating in a conventional manner subject to the improvements of the present invention.

Engine 12 is coupled to a transmission 26. Transmission 26 may be automatic, manual or continuously variable. Transmission 26 is coupled to a differential 28 to drive an axle 30 to provide power to wheels 32. Of course, the present invention is also applicable to four-wheel drive systems in which all of the wheels 32 are driven.

A starter/generator system 40 that includes a starter/generator 42 and its associated control electronics is coupled to engine 12. In the present invention, starter/generator 42 is positioned between a housing 44 of transmission 26 and the engine 12. Of course, those skilled in the art will recognize other positions are available including, but not limited to, belt driven types. Starter/generator 42 has a stator 46 fixedly attached to bell housing 44 and a rotor 48 coupled to a crankshaft 50 of engine 12. A clutch 52 is used to engage and disengage engine 12 from transmission 26. Starter/generator 42 is used as a starter during engine startup and as an alternator to supply power to recharge the batteries of the vehicle and to supply electrical loads. Clutch 52 allows starter/generator 42 to start the engine prior to engagement of the transmission.

A vehicle system controller 54 is coupled to starter/generator system 40. Vehicle system controller 54 is coupled to powertrain control unit 22, to a power inverter 56 and a battery control module 57. Collectively, controller 54 and battery control module 57 may be referred to as a controller. In practice, the power inverter 56, system controller 54 and battery control module 57 may be contained in a single package or interconnected using a bus system, thus making it unimportant which signals are generated at which device. The inverter 56 is used to convert DC power to AC power in the motoring mode and AC power to DC power in power generation mode as will be further described below.

Battery controller 57 is coupled to 42-volt battery 64 to monitor the voltage 76 and a current. By monitoring the battery voltage and current, the state of charge of the 42-volt battery 64 may be determined.

Power inverter 56 is coupled to an energy storage device 58 such as an ultra capacitor, a first DC-to-DC converter 60, and a second DC-to-DC converter 62. DC-to-DC converter 60 is coupled to a nominal 36-volt battery 64. DC-to-DC converter 62 is coupled to a nominal 12-volt battery 66. Of course, the actual battery voltage is dependent on the particular system to which it is attached. The present invention is particularly useful when one battery voltage is much greater than the other battery voltage.

It should also be noted that a contractor 68 may be electrically coupled between 36-volt battery 64 and DC-to-DC converter 60 to provide electrical isolation between the 36-volt battery and the rest of the vehicle. Battery control module 57 is coupled to contactor 68 to control the opening and closing of contactor 68.

System controller 54 is also coupled to an indicator 80. Indicator 80 may comprise an audible indicator, a visual indicator, or a combination of the two. One example of an indicator is an LCD display that can display various messages and actions for the vehicle operator to perform. Instrument panel reminder lights or chimes may also be used to generate messages.

A 12-volt source 65 such as a 12-volt battery from another vehicle, battery charger or generator is shown electrically coupled to 12-volt battery 66.

Referring now to FIG. 2, a method for charging a 12-volt battery when the 42-volt battery is charged is illustrated. In step 100 if the 12-volt battery is not dead and the 42-volt battery is not charged the system starts again in step 100. In step 100 if the 12-volt battery is not charged and the 42-volt battery is charged, step 102 is executed. In step 102, the 12-volt battery is charged in a conventional manner. That is jumper cables may be connected from a 12-volt source such as another charged battery. Typically, when charging a 12-volt battery the positive terminal of the charged battery is connected to the positive terminal of the dead battery, while the negative terminal of the charged battery is coupled to chassis ground in the vehicle with the dead battery. The negative battery terminals may also be coupled together. In step 104 the charge of the 12-volt battery is monitored during the charging process. In step 106 a message indicating that the 12-volt battery charging is complete may be displayed to the driver. The message may take the form of one of the indicators described above such as audible, an indicator light, or an LCD message.

Referring now to FIG. 3, a method for charging the 42-volt battery whether or not the 12-volt battery is discharged is illustrated. In the case where a 12-volt battery is discharged, the 12-volt battery may be charged simultaneously with the 42-volt battery. In step 110, if the 42-volt battery is not dead the system continues checking in step 110. In step 110, if the 42-volt battery is dead step 112 is executed. In step 112 a switch may be activated as will be further described below. If the switch is activated, the jumpstart process has been entered. This step is performed simultaneously with step 114. In step 114 the jumper cables are connected to the 12-volt battery in the manner described above. During the process, messages or other indicators may be illuminated. In step 116 if the 12-volt battery voltage is greater than the voltage of the 42-voltage battery an error message is generated in step 118. In step 116 if the 12-volt battery voltage is not greater than the 42-volt battery step 120 is executed. In step 120 the contactor 68 described above is closed. The DC-to-DC converter 60 is then used to convert the 12-volt power to 42-volt power so that 36-volt battery 64 may be charged in step 122. In step 124 the state of charge of the 36-volt battery is monitored. In step 126, a display message may be displayed to the vehicle operator to continue charging until otherwise notified. In step 128 the state of charge of the 42-volt battery is monitored. If the state of charge compared to a state of charge threshold indicates the 42-volt battery is not charged, steps 124 and 126 are again executed which continues displaying "continue charging." In step 128 if the state of charge is at a level indicating the 42-volt battery is charged (above a state of charge threshold), step 130 is executed. In step 130 the display indicator may indicate "discontinue charge" so that the vehicle operator knows the 42-volt battery is fully charged. In step 132 the vehicle may be started and normally operated since both of the batteries are charged. As mentioned above, the process illustrated in FIG. 3 may be used to charge the 42-volt battery as well as the 12-volt battery, if needed. Of course, more than one of each type of battery may be provided in an automotive vehicle. That is, the 42-volt battery may be charged and fully functional prior to entering step 110 above.

Referring now to FIG. 4, if an LCD type display is not available, a cover 150 having an electrical switch 152 coupled to battery control module 57 may be provided. Switch 152 generates an electrical signal as to the presence or non-presence of battery terminal 154 of battery 66. Thus, when cover 150 is opened, battery control module 157 enters a charging sequence. Thus, indications may be provided through an indicator light or an audible warning.

Thus, as can be seen, only a 12-volt battery source is required to charge the 42-volt battery. The DC-to-DC converter converts the 12-volt charging current to a voltage and current capable of charging the 36-volt battery. Thus, particularly during the introduction of such vehicles, commonly found 12-volt battery systems may be readily available to charge such systems in the event the 42-volt battery is discharged.

While particular embodiments of the invention have been shown and described, numerous variations and alternate embodiments will occur to those skilled in the art. Accordingly, it is intended that the invention be limited only in terms of the appended claims.

What is claimed is:

1. A method of charging a high voltage battery comprising:

electrically coupling a first low voltage source to a low voltage battery;

converting the low voltage to a high voltage;

charging a high voltage battery with the high voltage;

monitoring a state of charge of the high voltage battery;

comparing the state of charge to a predetermined state of charge; and generating an indicator when the state of charge reaches the predetermined state of charge.

2. A method as recited in claim 1 wherein when monitoring a state of charge comprises measuring a battery voltage and measuring a battery current.

3. A method as recited in claim 1 further comprising coupling the low voltage battery to a high voltage battery through a contactor.

4. A method as recited in claim 3 further comprising comparing the low voltage battery voltage and the high voltage battery voltage and controlling the contactor in response to comparing.

5. A method as recited in claim 1 wherein converting comprises converting the low voltage to a high voltage using a DC-to-DC converter.

6. A method as recited in claim 1 wherein said predetermined state of charge corresponds to a starting state of charge to enable starting of the engine with a starter/generator.

7. A method as recited in claim 1 wherein generating an indicator comprises generating a visual indicator.

8. A method as recited in claim 1 wherein generating an indicator comprises generating an audible indicator.

9. A method as recited in claim 1 further comprising generating an initiating electrical signal from a switch coupled to a battery terminal.

10. A method as recited in claim 1 wherein the indicator indicates the high voltage battery is charged.

11. A method as recited in claim 1 further comprising generating a second indicator indicating the high voltage battery is not charged when the state of charge is less than the predetermined threshold.

12. A method of charging a high voltage battery through a first low voltage battery generating a low voltage with a low voltage source electrically coupled to the low voltage battery comprising:

converting the low voltage to a high voltage through a DC-to-DC converter;

charging a high voltage battery with the high voltage;

monitoring a state of charge of the battery;

comparing the state of charge to a predetermined state of charge;

generating a first indicator when the state of charge is below the predetermined state of charge; and generating a second indicator when the state of charge reaches the predetermined state of charge.

13. A method as recited in claim 12 wherein when monitoring a state of charge comprises measuring a battery voltage and measuring a battery current.

14. A method as recited in claim 12 further comprising coupling the low voltage battery to a high voltage battery through a contactor.

15. A method as recited in claim 14 further comprising comparing the first battery voltage and the second battery voltage and controlling the contactor in response to comparing.

16. A system for an automotive vehicle comprising:

a low voltage battery having a low voltage;

a high voltage battery having a high voltage;

a DC-to-DC converter coupled between the low voltage battery and the high voltage battery; and a controller coupled to the high voltage battery, the low voltage battery and said controller controlling a conversion of the low voltage to a high voltage through the DC-to-DC converter and controlling charging of the high voltage battery with the high voltage, said controller monitoring a state of charge of the high voltage battery, comparing the state of charge to a predetermined state of charge, said controller generating an indicator when the state of charge reaches the predetermined state of charge.

17. A system as recited in claim 16 further comprising a starter/generator and a starting load, wherein said predetermined state of charge being a function of said temperature and said starting load.

18. A system as recited in claim 16 further comprising a battery terminal cover coupled to a battery terminal of the low voltage battery.

19. A system as recited in claim 16 further comprising a battery terminal cover generating an electrical signal when the battery terminal cover is in an open position, said electrical signal coupled to said controller.

20. A hybrid electric vehicle having a system as recited in claim 16.

\* \* \* \* \*